United States Patent
Higley et al.

(10) Patent No.: US 12,422,627 B2
(45) Date of Patent: Sep. 23, 2025

(54) DATA CENTER INTERCONNECT FOR OPTICAL TRUNK CABLES HAVING MINIATURE MULTI-FIBER FERRULES

(71) Applicant: US Conec Ltd., Hickory, NC (US)

(72) Inventors: Jason Higley, Hickory, NC (US); Darrell R. Childers, Hickory, NC (US)

(73) Assignee: US Conec Ltd., Hickory, NC (US)

(*) Notice: Subject to any disclaimer, the term of this patent is extended or adjusted under 35 U.S.C. 154(b) by 236 days.

(21) Appl. No.: 18/311,110

(22) Filed: May 2, 2023

(65) Prior Publication Data

US 2023/0350136 A1    Nov. 2, 2023

Related U.S. Application Data

(60) Provisional application No. 63/337,254, filed on May 2, 2022.

(51) Int. Cl.
*G02B 6/40* (2006.01)
*G02B 6/38* (2006.01)

(52) U.S. Cl.
CPC .......... *G02B 6/403* (2013.01); *G02B 6/3849* (2013.01); *G02B 6/3898* (2013.01)

(58) Field of Classification Search
CPC .... G02B 6/403; G02B 6/3849; G02B 6/3898; G02B 6/3879; G02B 6/3831; G02B 6/3885; G02B 6/3893
See application file for complete search history.

(56) References Cited

U.S. PATENT DOCUMENTS

| | | | |
|---|---|---|---|
| 10,712,519 B2* | 7/2020 | Faulkner | G02B 6/44715 |
| 10,852,490 B2* | 12/2020 | Chang | G02B 6/3825 |
| 11,112,567 B2* | 9/2021 | Higley | G02B 6/3825 |
| 11,474,307 B2* | 10/2022 | Childers | G02B 6/3885 |
| 2021/0325614 A1 | 10/2021 | Childers et al. | |
| 2023/0091327 A1 | 3/2023 | Kurtz et al. | |
| 2023/0176294 A1 | 6/2023 | Higley et al. | |
| 2024/0302621 A1* | 9/2024 | Cooke | G02B 6/54 |
| 2024/0427108 A1* | 12/2024 | Garcia Medina | G02B 6/545 |

* cited by examiner

*Primary Examiner* — John Bedtelyon
(74) *Attorney, Agent, or Firm* — Michael L. Leetzow PLLC; Shubhrangshu Sengupta

(57) ABSTRACT

An optical interconnect assembly includes a pre-terminated trunk cable assembly with a cable bundle having a plurality of optical fiber trunk cables terminating in ribbonized groups of optical fiber and a plurality of terminated small form factor fiber optic connectors for inclusion in a pulling sock attached to the plurality of optical fiber trunk cables. Each of the connectors has a push-pull stick with a pair of side latches on opposing sides of the central portion, a ferrule push, a housing configured to engage the push-pull stick and the ferrule push, a miniature multi-fiber ferrule, and a dust cap. The components are provided inside the pulling sock with at least one additional one of the plurality of terminated small form factor fiber optic connector identical to the first small form factor fiber optic connector.

20 Claims, 11 Drawing Sheets

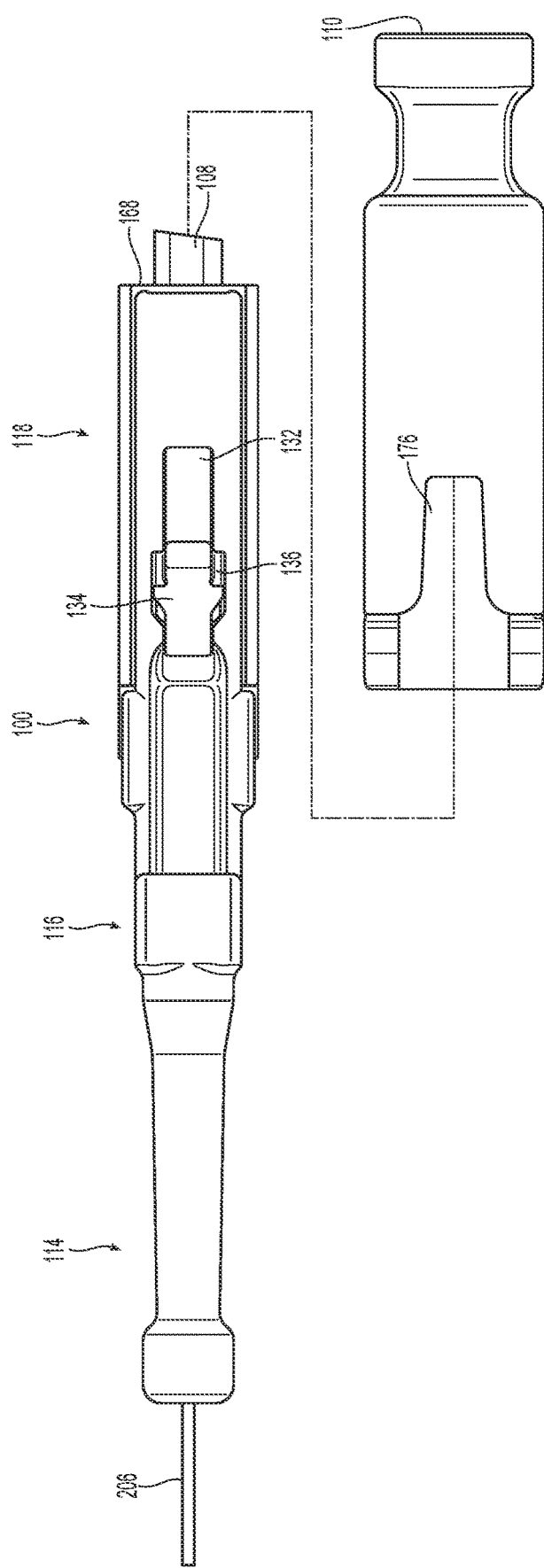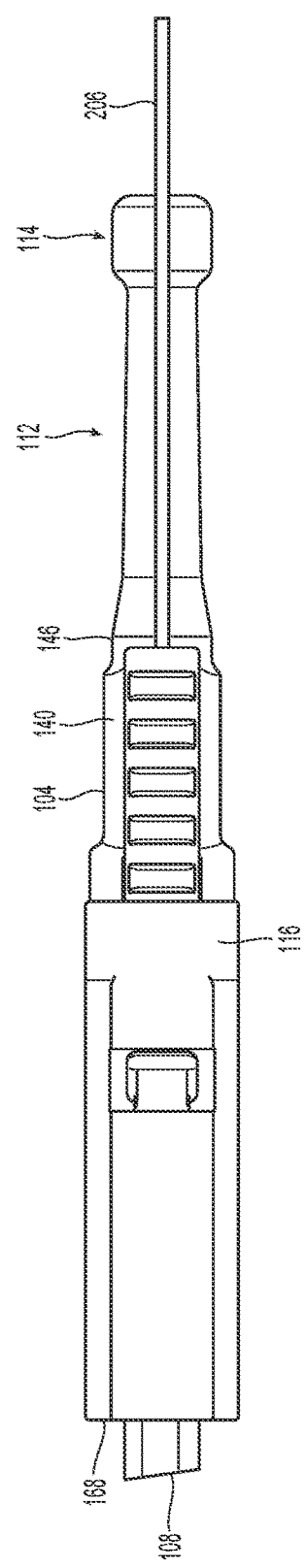

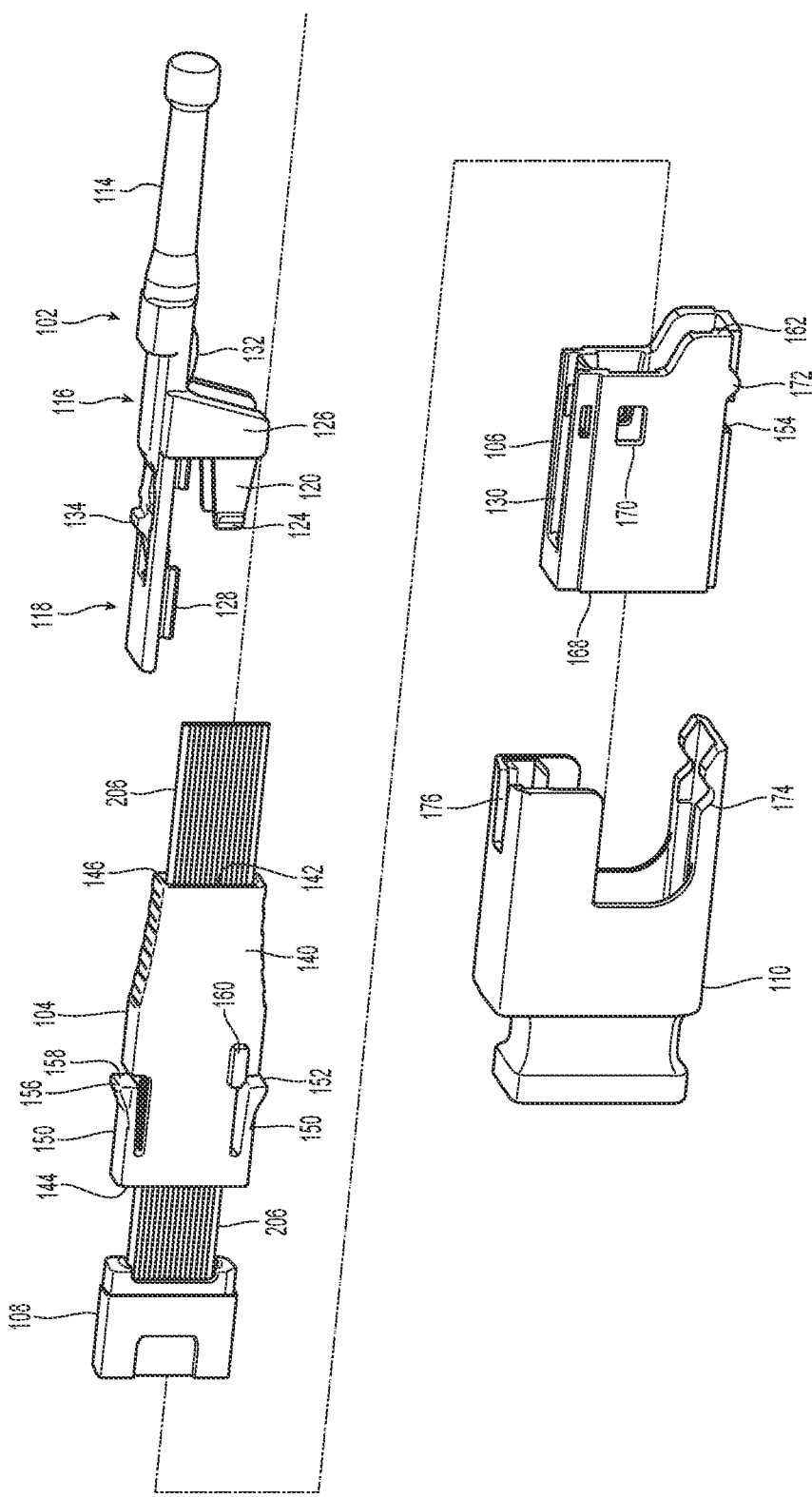

DATA CENTER INTERCONNECT FOR OPTICAL TRUNK CABLES HAVING MINIATURE MULTI-FIBER FERRULES

REFERENCE TO RELATED CASE

This application claims priority under 35 U.S.C. § 119 (e) to U.S. provisional application No. 63/337,254 filed on May 2, 2022, the contents of which are hereby incorporated by reference in their entirety.

BACKGROUND OF THE INVENTION

Interconnect systems for MT ferrules involving pre-installed MPO connector housings in an adapter are known. In such systems, the MT ferrule is pre-installed with a ferrule push on a group of optical fibers in a trunk cable of a cable bundle and resides inside a pulling sock of the trunk cable, along with several other MT ferrules. During installation at the adapter, the pulling sock is opened and the MT ferrules are pushed into the pre-populated adapter having the MPO connector housings. The pre-installed MT ferrule is part of a pre-terminated trunk cable on a reel, and a pulling grip assembly (also referred to as the "pulling sock") is installed over an end portion of the pre-terminated trunk cable. The pulling sock covers all of several such MT ferrules, the ferrule push components, and dust caps associated with the MT ferrule. One such setup is described in Applicant's co-owned U.S. patent application Ser. No. 17/227,750 (published as US 2021/0325614, hereinafter "the '614 publication"), incorporated by reference herein in its entirety. The MPO connector, when fully assembled with the housing (which is instead pre-assembled with the adapter in the '614 publication above), is too big to fit inside the pulling sock. Hence, only the conventional MT ferrule with the associated ferrule push have thus far been utilized inside the pulling sock, while the adapter panel with adapters is pre-populated separately with the MPO housing components (that only accept the terminated MT ferrules from the pulling sock). To complete the interconnect, the conventional MT ferrules are pulled out of the pulling sock, and the respective ferrule push is used to push the MT ferrule into the pre-assembled MPO housing at the adapters.

However, interconnect components are getting smaller to address higher spatial density of connectors in data centers, and also to accommodate higher bandwidth requirements. To this end a miniature MT ferrule, referred to as the TMT ferrule, has been introduced by the Applicant, and disclosed in Applicant's WIPO Publication No. WO 2021/217050 ("the '050 publication"), incorporated by reference herein in its entirety. The TMT ferrule has a significantly smaller footprint compared to the MT ferrule to meet industry small form factor standards and multi-source agreements (MSAs), such as QSFP-DD. The TMT ferrule is also referred to as a miniature multi-fiber ferrule since it is significantly smaller than the conventional MT-ferrule and has typical dimensions of 1.25 mm height, 4 mm length (between the front end and the rear end), and a width of 6.4 mm side-to-side. The associated housing for the TMT ferrule is also smaller than a comparable MPO housing per such standards. Once assembly with the TMT ferrule and associated housing is complete, the resulting combination is referred to as the MMC connector.

With smaller fiber optic connector footprints being increasingly adopted, there is a desire to have the TMT ferrule be included inside the pulling sock, while at the same time, utilizing the smaller size of the TMT ferrule housing to have the whole MMC connector inside the trunk cable. As a result, the pulling sock needs to be opened and the MMC connector that is pulled out can then be directly inserted into an adapter. To further increase the packing density of components inside the pulling sock, it is also desired that only the miniature multi-fiber ferrule and the ferrule push be included inside the pulling sock (with a smaller ferrule dust cap) during manufacture of the pre-terminated trunk assembly inside a cable bundle on a reel.

SUMMARY OF THE INVENTION

According to one aspect, the present invention is directed to a cable bundle attached to an optical fiber trunk cable having ribbonized optical fibers that includes a plurality of terminated small form factor fiber optic connectors for inclusion in a pulling sock attached to the optical fiber trunk cable, each small form factor fiber optic connector includes a push-pull stick with a rear portion, a central portion and a forward extension extending away from the central portion and the rear portion, wherein the push-pull stick further includes a pair of side latches on opposing sides of the central portion, the side latches also extending forward and away from the central portion and the rear portion, a ferrule push positioned underneath the forward extension of the push-pull stick and at least partially between the side latches, there being a space to receive the ferrule push between the side latches of the push-pull stick, a housing configured to engage the two side latches of the push-pull stick and the at least one projection from the ferrule push, a miniature multi-fiber ferrule configured to support at least two optical fibers of the ribbonized optical fibers and engaged to a front portion of the housing, the miniature multi-fiber ferrule engageable directly or indirectly to a front surface of the ferrule push, wherein the miniature multi-fiber ferrule has an end face that is outside the housing when the miniature multi-fiber ferrule is seated inside the housing, and a dust cap engaged to the housing from a front end of the housing, the end face of the miniature multi-fiber ferrule being fully covered by the dust cap, wherein the dust cap, the housing, the miniature multi-fiber ferrule with the at least two optical fibers, the ferrule push, and the push-pull stick of a first of the plurality of terminated small form factor fiber optic connectors are provided inside the pulling sock with at least one additional one of the plurality of terminated small form factor fiber optic connector identical to the first small form factor fiber optic connector.

In some embodiments, there is also an adapter panel having a plurality of adapters, the plurality of adapters are each shorter than 5 mm.

In some embodiments, the at least a portion of a rear end of the ferrule push extends underneath the rear end of the push-pull stick.

In some embodiments, the ferrule push has at least one projection with a latch at a front portion thereof.

In some embodiments, the dust cap has an opening for a polarity key on the push-pull stick.

In some embodiments, the ferrule push has a non-circular opening to receive the at least two optical fibers therethrough.

In some embodiments, the ferrule push has a circular opening to receive the at least two optical fibers therethrough.

In some embodiments, the rear portion of the push-pull stick is an elongated projection parallel to and not engaging the at least two optical fibers.

In some embodiments, the ferrule push extends rearwardly of all other components for each of the plurality of terminated small form factor fiber optic connectors to allow a user to push and pull on one or more of the plurality of terminated small form factor fiber optic connectors.

In another aspect, the present invention is directed to an optical cable bundle that includes a plurality of fiber optic connectors, each of the plurality of fiber optic connectors further includes a miniature multi-fiber ferrule having respective ribbonized optical fibers terminated therein, the miniature multi-fiber ferrule has dimensions smaller than a standard MT ferrule, a ferrule push associated with the miniature multi-fiber ferrule and having an opening for the respective ribbonized optical fibers, the ferrule push being loosely positioned rearward of miniature multi-fiber ferrule, a ferrule dust cap engaged to the ferrule push and covering an end face of the miniature multi-fiber ferrule, and a pulling sock for retaining the plurality of fiber optic connectors.

In some embodiments, the miniature multi-fiber ferrule in each of the plurality of fiber optic connectors are TMT ferrules.

In some embodiments, there is also a push-pull stick with a rear portion, a central portion and a forward extension extending away from the central portion and the rear portion, wherein the push-pull stick further includes a pair of side latches on opposing sides of the central portion, the side latches also extending forward and away from the central portion and the rear portion.

In another aspect, the present invention is directed to an optical cable bundle that includes a plurality of fiber optic connectors, each of the plurality of fiber optic connectors further comprising a miniature multi-fiber ferrule having respective ribbonized optical fibers terminated therein, the miniature multi-fiber ferrule has dimensions smaller than a standard MT ferrule, a ferrule push associated with the miniature multi-fiber ferrule and having an opening for the respective ribbonized optical fibers, the ferrule push being loosely positioned rearward of miniature multi-fiber ferrule, a ferrule dust cap engaged to the ferrule push and covering an end face of the miniature multi-fiber ferrule, and a boot with a rear portion surrounding at least a portion of the ferrule push, a central portion and a forward extension extending away from the central portion and the rear portion, wherein the boot further includes a pair of side latches on opposing sides of the central portion, the side latches also extending forward and away from the central portion and the rear portion; and a pulling sock for retaining the miniature multi-fiber ferrule, the ferrule push and the ferrule dust cap.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 4 is top planar view of the fiber optic connector in FIG. 1;

FIG. 5 is bottom planar view of the fiber optic connector in FIG. 1;

FIG. 6 is an exploded view of the fiber optic connector in FIG. 1 from the left side;

DETAILED DESCRIPTION OF THE INVENTION

Figure 1:
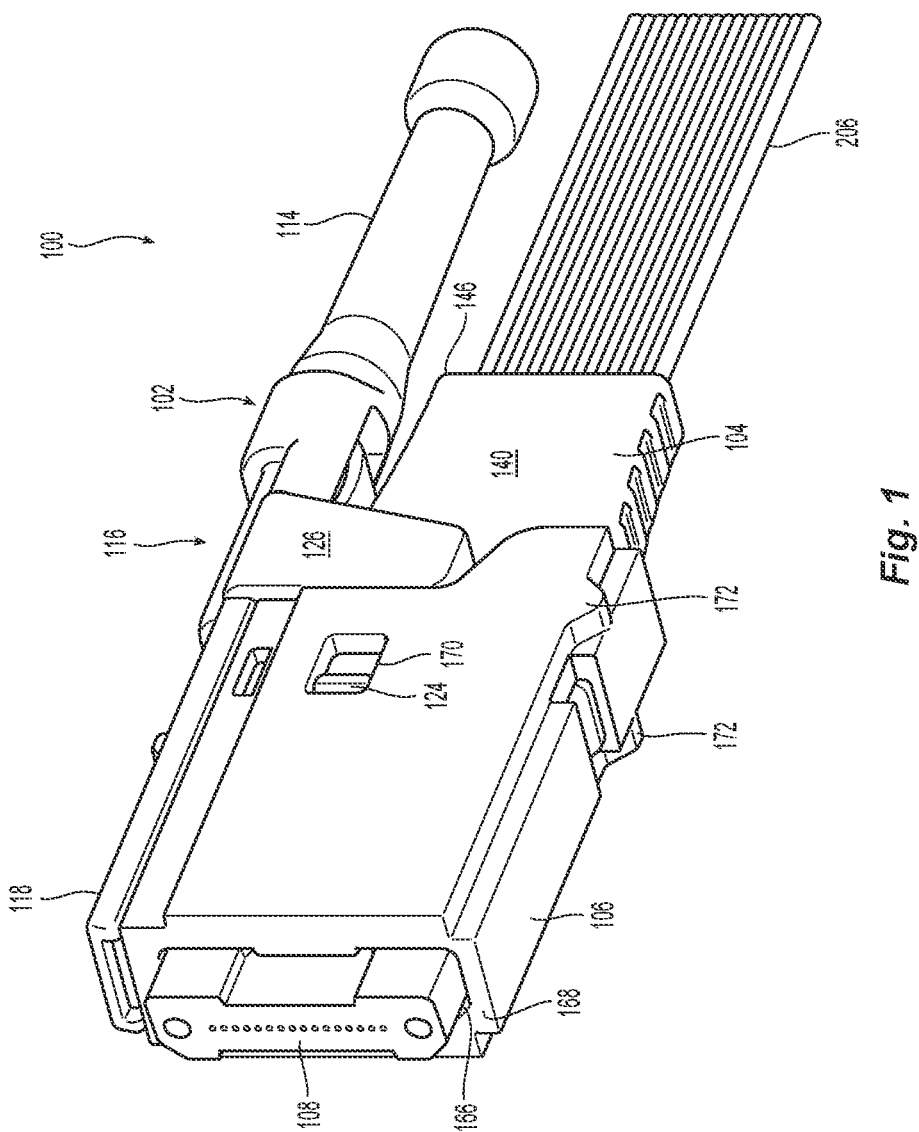
FIG. 1 is a front perspective view from the bottom of one embodiment of a fiber optic connectors according to the present invention.
Figure 2:
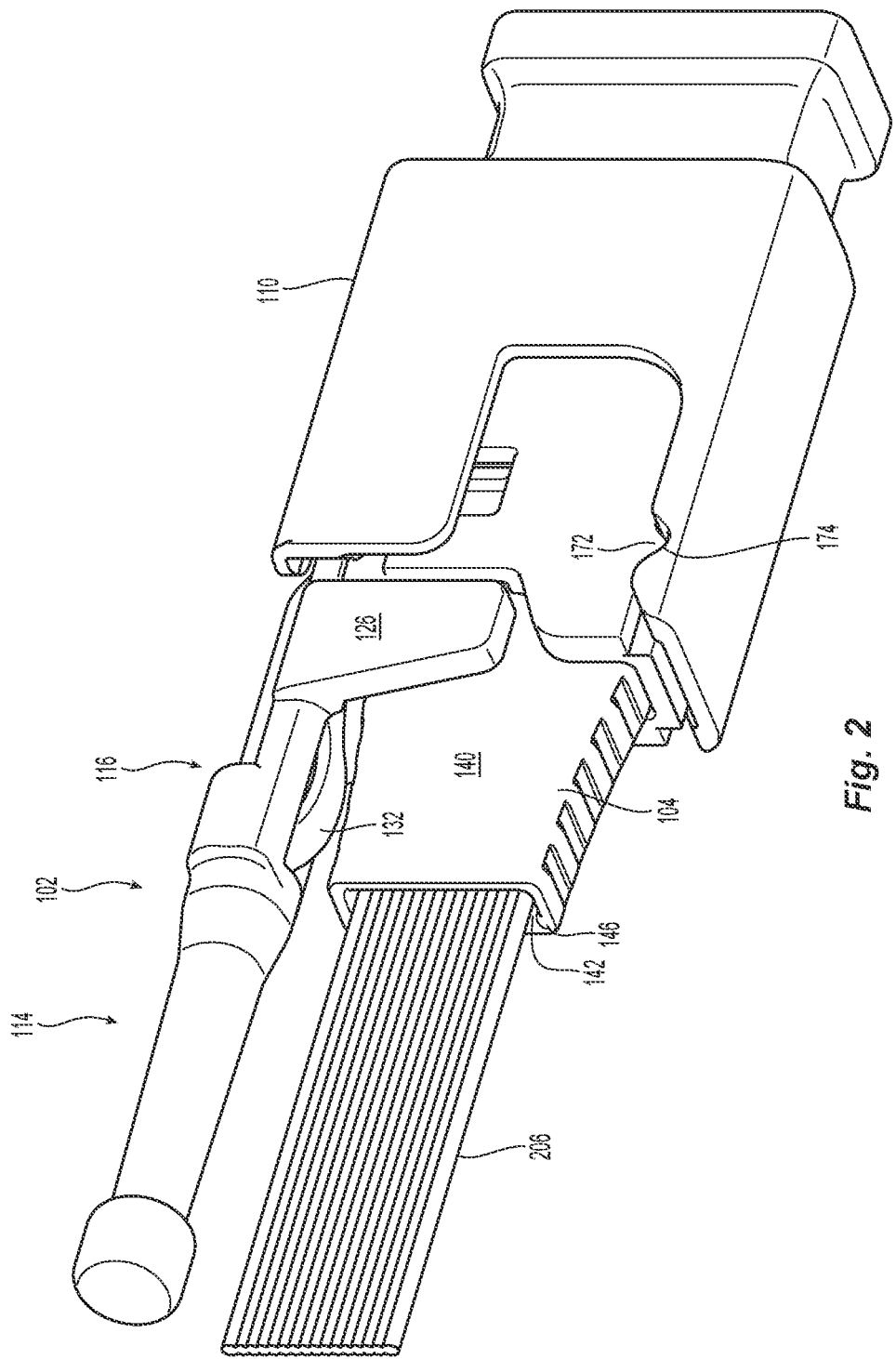
FIG. 2 is a rear perspective view from the bottom the fiber optic connector in FIG. 1.
Figure 3:
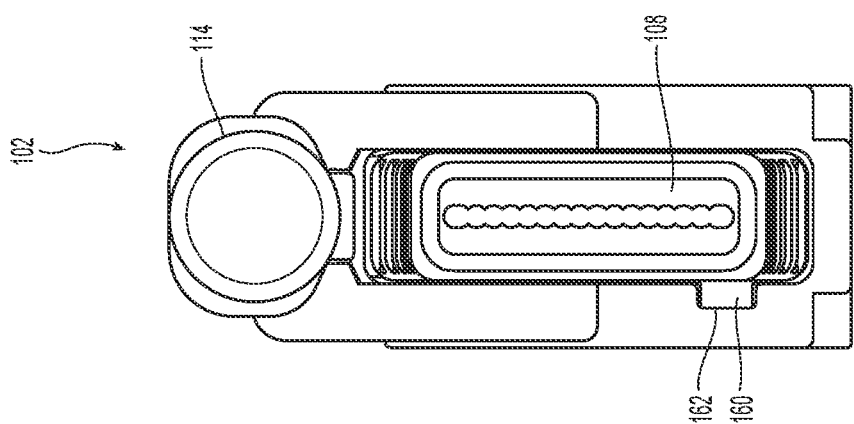
FIG. 3 is a rear elevational view of the fiber optic connector in FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" as used herein means that direction where the fiber optic connectors 100 would meet with another fiber-optic connector or device or mating ferrules, while the term "rear" or "rearward" is used to mean the direction from which the optical fibers enter into the fiber optic connectors 100. Each of the components will therefore have a front and rear, and the two respective fronts or forward portions of opposing ferrules, for example, would engage one another. Thus, for example, in FIG. 1, the "front" of the fiber-optic connectors 100 is on the left side and "forward" is to the left and out of the page. "Rearward" or "rear" is that part of the fiber-optic connectors 100 that is on the right side of the page and "rearward" and "backward" is toward the right and into the page.

Figure 11:
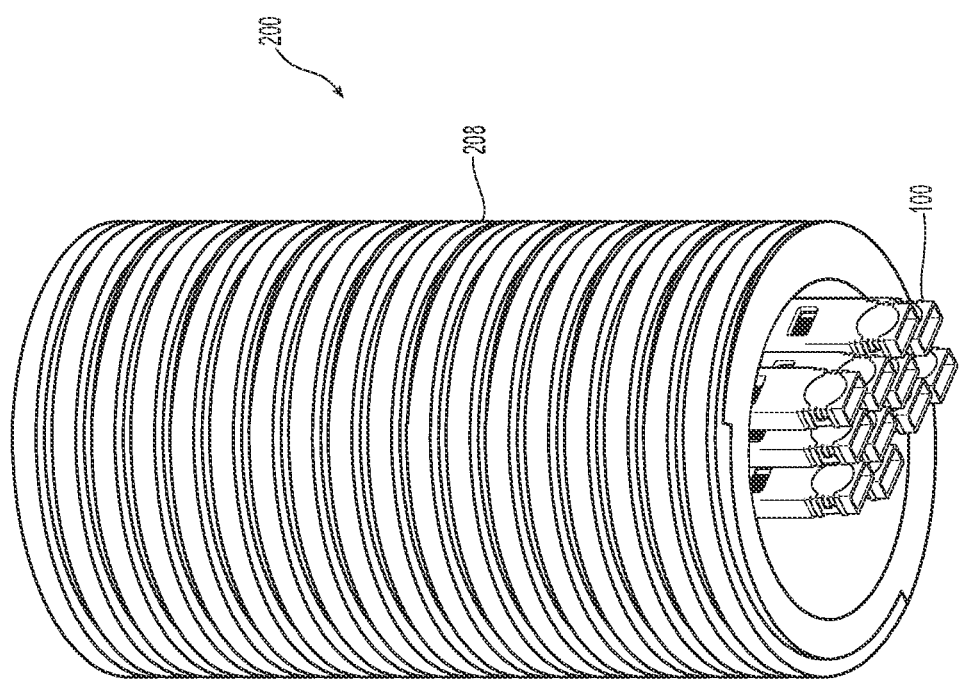
FIG. 11 is a perspective view of a plurality of fiber optic connectors in a pulling sock.

Illustrated in FIGS. 1-8 is one example of a small form factor fiber optic connector 100 (connector 100) that, along with the pulling sock (pulling plug/grip) 208 makes up a cable bundle 200, which in turn is attached to an optical fiber trunk cable 202 on a reel 204 according to one embodiment of the present invention. See FIGS. 9 and 11.

As noted above, the optical fiber trunk cable 202 has a plurality of optical fibers 206 (see, e.g. FIG. 1) and there are a plurality of small form factor fiber optic connectors 100 that are connected to the plurality of optical fibers 206 of the optical fiber trunk cable 202. In this way, a larger number of connectors 100 can be installed faster, easier, and with fewer complications normally associated with such installations.

The connectors 100 to be used with the cable bundle 200 according to the present invention have a push-pull stick 102, a ferrule push 104, a housing 106, a miniature multi-fiber ferrule 108, and a dust cap 110 (also referred to herein as "ferrule dust cap 110"). There may be other components of the connector 100 that are not shown here but may include a pin keeper or spacer, a spring to bias the miniature multi-fiber ferrule 108, etc. See also FIG. 10. The details of each of these components will now be discussed with particular reference to FIG. 6, but also FIGS. 1-8.

The push-pull stick 102 has a rear portion 114, a central portion 116 and a forward extension 118 extending away from the central portion 116 and the rear portion 114. The rear portion 114 of the push-pull stick 102 is an elongated projection parallel to but does not engage the optical fibers 206. See FIGS. 1 and 7.

Figure 8:
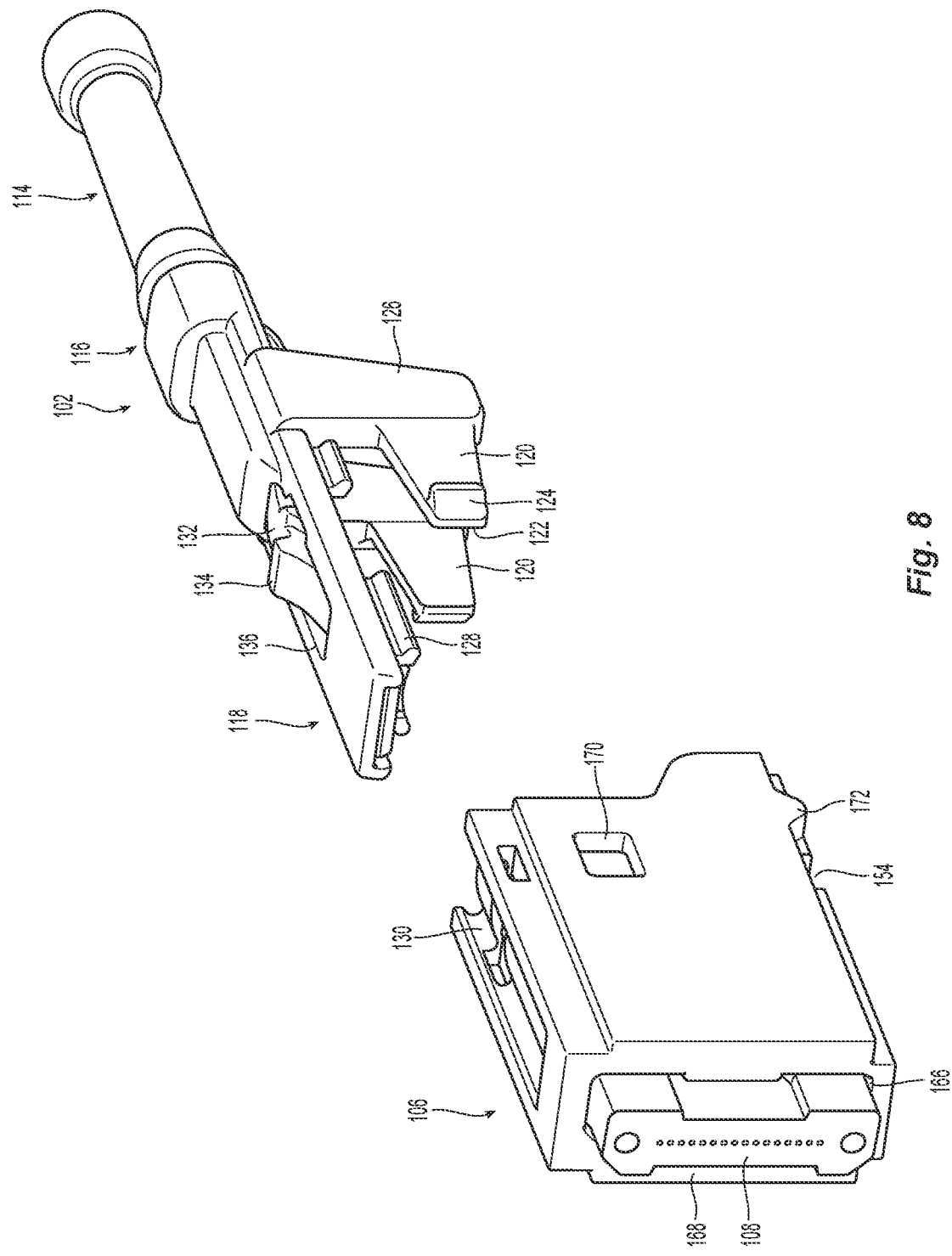
FIG. 8 is an exploded view from the front left of the push-pull stick, and connector housing of the fiber optic connector in FIG. 1.
Figure 9:
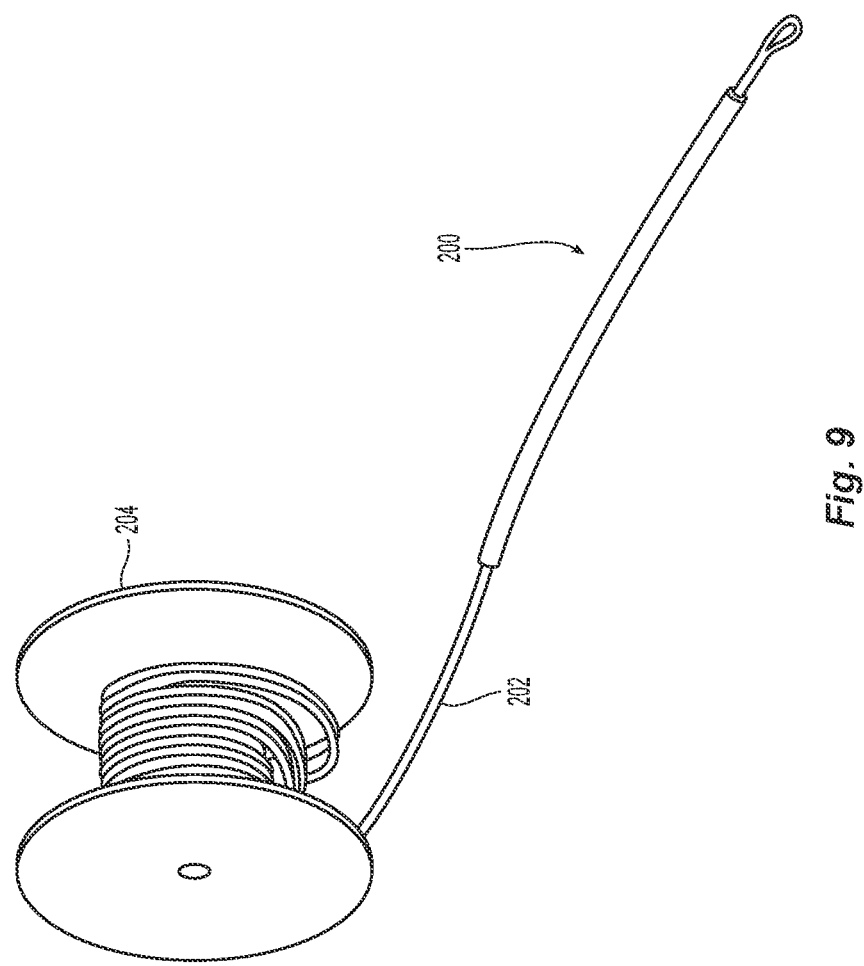
FIG. 9 is a front perspective view of an optical fiber trunk cable and pulling sock to be used with the fiber optic connector in FIG. 1 as a part of an optical cable bundle.

The push-pull stick 102 further includes a pair of side latches 120 on opposing sides of the central portion 116 (see FIGS. 6 and 8). As explained in more detail below, the pair of side latches 120 engage an opening in the housing 106. The pair of side latches 120 also extend forward and away from the central portion 116 and the rear portion 114. The front 122 of each of the pair of side latches 120 has a chamfered surface 124 that engages the housing 106 as the push-pull stick 102 is mated to the housing 106. The pair of side latches 120 are urged toward each other when making contact with the housing 106 and when the pair of side latches 120 is sufficiently inserted into the housing 106, the pair of side latches 120 return to their normal configuration with the side latches 120 engaging openings 170 in the housing 106. As will be recognized from FIG. 6, the mating of the push-pull stick 102 with the housing 106 retains the other elements of the connectors 100 (e.g., the ferrule push 104 and the miniature multi-fiber ferrule 108) therein.

Preferably the push-pull stick 102 also has two downwardly extending tabs 126 in the central portion 116 to engage a portion of the housing 106 and act as a stop surface. The two downwardly extending tabs 126 will engage a front surface of the housing 106 if the push-pull stick 102 is pushed too far into the housing 106 and past the openings 170. The pair of side latches 120 may be attached to or formed integrally with the two downwardly extending tabs 126 in the central portion 116 of the push-pull stick 102. See FIGS. 6 and 8, for example. Alternatively, the pair of side latches 120 may be separately attached to the tabs 126.

Figure 12:
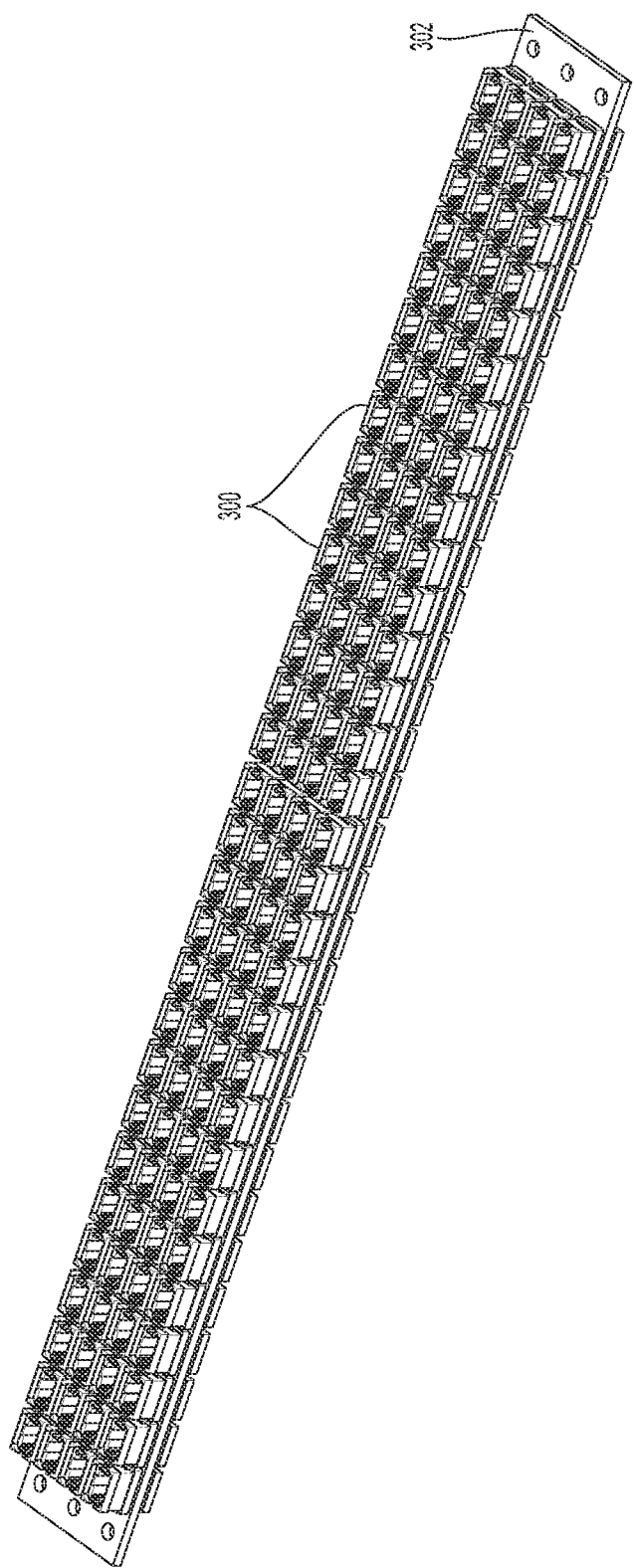
FIG. 12 is perspective of one embodiment of an adapter panel and adapters to be used with the small form factor fiber optic connector.

The push-pull stick 102 has features 128 that allow for the push-pull stick 102 to movably engage the housing 106. The features 128 are a dove-tail or undercut feature of the forward extension 118 that engages and slides in a groove 130 on the housing 106. See FIGS. 6 and 8. The forward extension 118 of the push-pull stick 102 also has a latch mechanism 132 that allows the connector 100 to be secured within an adapter 300 that is disposed within an adapter panel 302 or some other type of appropriate receptacle. See, e.g., FIG. 12. The latch mechanism 132 is disposed mostly under the forward extension 118 but extends rearwardly towards the central portion 116. The latch mechanism 132 has a projection 134 that rises through an opening 136 in the forward extension 118 to engage the adapter 300. Thus, pulling on the push-pull stick 102 moves the latch mechanism 132 downward into the push-pull stick 102 and disengages it from the adapter 300, releasing the connector 100. Pushing on the push-pull stick 102 pushes the connector 100 into the adapter 300 or other receptacle and the projection 134 is pushed downward as the connector 100 is inserted into the receptacle. Once the connector is fully inserted, the projection 134 rises back up and engages a structure on the receptacle thereby allowing the connector 100 to be locked into the adapter 300.

In one aspect of this disclosure, the housing 106, the latch mechanism, 132, and the push-pull stick 102 are pre-installed on the adapter 300 to save space in a pulling sock 208. That is the pulling sock 208 will then only include several of the miniature multi-fiber ferrule 108 terminated with the optical fibers 206, the ferrule push 104, and the dust cap 110. The pin clamp (e.g., pin clamp 412) may also be included inside the pulling sock 208. After pulling the combination of the fiber ferrule 108 terminated with the optical fibers 206, the ferrule push 104, and the dust cap 110 from the pulling grip 208, these may be installed into the adapter 300 that is pre-populated with the housing 106, the latch mechanism 132, and the push-pull stick 102. The adapter 300 is provided on the adapter panel 302 having a plurality of adapters similar to the adapter 300, each of the plurality of adapters 300 are shorter than 5 mm.

The connector 100 may also include a ferrule push 104 positioned underneath the forward extension 108 of the push-pull stick 102 and at least partially between the pair of side latches 120. Due to the separation of the pair of side latches 120, there is a space 122 to receive the ferrule push 104 between the pair of side latches 120 of the push-pull stick 102.

The ferrule push 104 has a main body 140 with a central opening 142 that continues along the main body 140 internally from a front end 144 to a rear end 146 of the main body 140. See FIGS. 6 and 7. The rear end 146 is generally rectangular but could be of other shapes including circular (see FIG. 10) or non-circular. The central opening 142 may narrow between the front end 144 and the rear end 146, with a transition area 148 in between (see also FIG. 10 for another embodiment). The central opening 142 may be generally uniform to accommodate a ribbon format for the optical fibers between the front end 144 and the rear end 146. Since the optical fibers 206 are already in a ribbonized form, a width of the central opening 142 through which the ribbonized optical fibers 206 pass is preferably less than a width of the ribbon (in a top to bottom direction in FIG. 7), at least at the front end 144, and possibly all throughout a length of the ferrule push 104. Such a width prevents the ferrule push 104 from being rotated relative to the ribbonized optical fibers 206 and the miniature multi-fiber ferrule 108 (TMT ferrule, for example), when inside the pulling grip 208, and even afterwards when the miniature multi-fiber ferrule 108 engages the ferrule push 104. This relative dimension between the ribbonized optical fibers 206 and the central opening 142 prevents the terminated ribbonized optical fibers 206 from falling out of or disassociating from the ferrule push 104. The ferrule push 104 has substantially the same footprint as the miniature multi-fiber ferrule 108, at least at the front end of the ferrule push 104.

Figure 7:
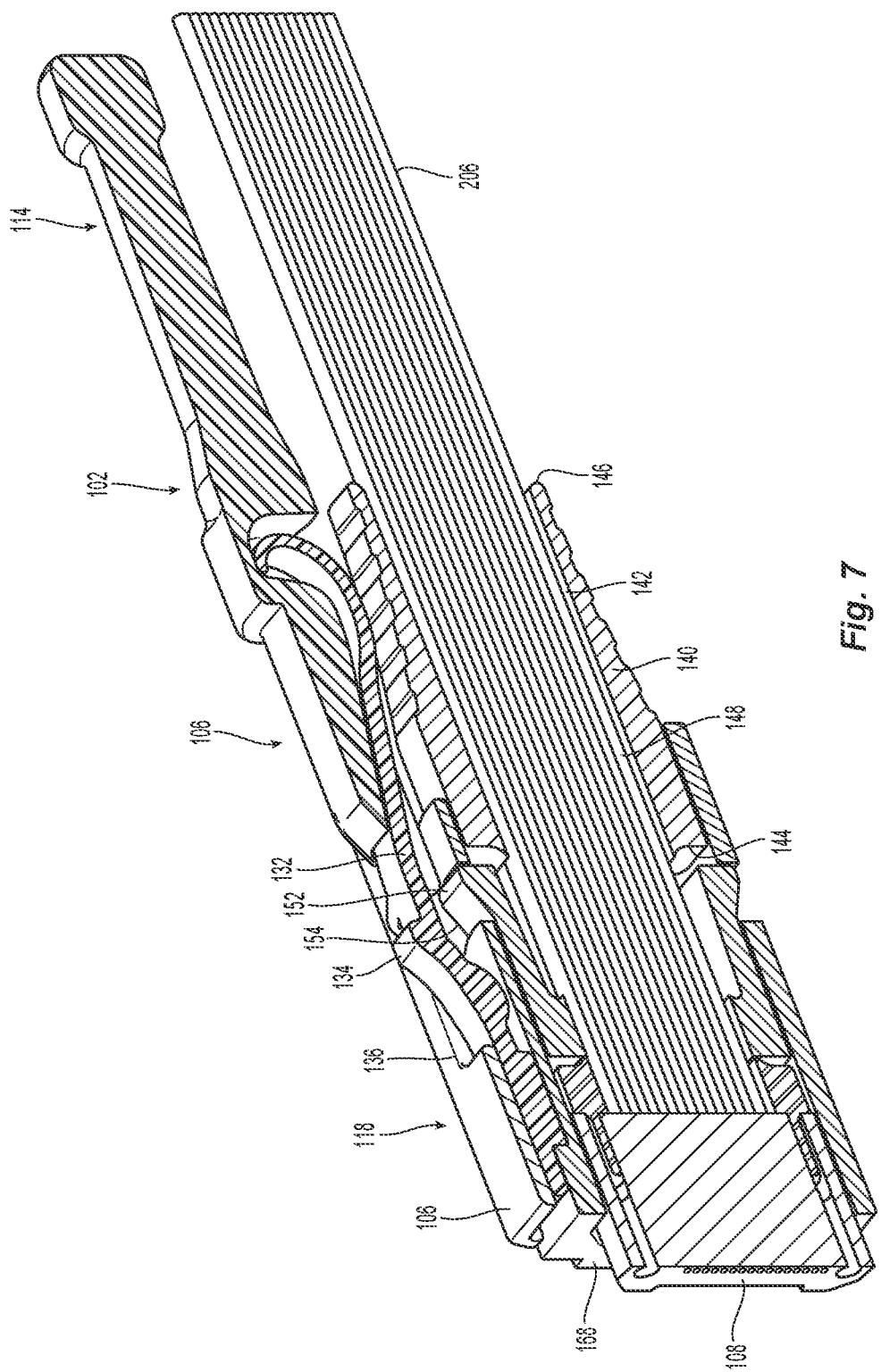
FIG. 7 is a cross sectional view of the fiber optic connector in FIG. 1 from the upper left.

The ferrule push 104 has at least one projection 150 with a latch 152 that extends from the main body 140 to engage a corresponding opening 154 in the housing 106 (see FIG. 7). The projection 150 extends rearward within a cutout into the main body 140 and ends at the latch 152. For example, the top side and the bottom side of the housing 106 may each have an opening 154 (a top and a bottom opening, respectively) to receive the at least one projection 150. Preferably, there are two such projections 150, but only one may be necessary to retain the ferrule push 104 within the housing 106. As illustrated in figures, the projections 150 take the form of cantilevered arms that include a front facing chamfered surface 156 and a rear facing flat surface 158. See, e.g., FIG. 6. As the miniature multi-fiber ferrule 108 and the ferrule push 104 are inserted into the housing 106 from the rear end thereof, the front chamfered surface 156 engages the housing 106, causing the projection 150 to be flexed into a space of the top or bottom opening 154 in the main body 140. Once the ferrule push 104 is inserted into the housing 106 a sufficient distance, the projection 150 will return to its initial position and the rear facing flat surface 158 will engage the opening 154 in the housing. The ferrule push 104 cannot be removed from the housing 106 until and unless the projections 150 are removed from the opening 154, although once assembled as a full connector 100, there is no need for the ferrule push 104 to be removed from the housing 106. It is also possible that the latch or projection(s) 150/152 could be on the inside of the housing 106 and engage a cut-out, depression or other feature on the ferrule push 104 at a location where the projections 150 are currently shown in FIG. 7, although that may not be preferable for reasons related to ferrule stubbing during an insertion of the miniature multi-fiber ferrule 108 into the housing 106.

The ferrule push 104 may have an optional polarity key or polarity indicator 160. An example of such a polarity key is illustrated in FIG. 6. This allows the ferrule push 104 to be oriented in only one way in the housing 106. The housing 106 has a receptacle 162 on an inside surface thereof to receive the polarity key 160. See FIG. 3. Thus, if a user were to attempt to insert the ferrule push 104 into the housing 106 in some other orientation, the ferrule push 104 would be blocked since there would be interference at the key 160 between the ferrule push 104 and the housing 106. It will be appreciated by one of ordinary skill in the art that other locations or means for proper insertion of the ferrule push 104 into the housing 106 may be provided. For example, the polarity key 160 may disposed inside the housing 106 while the ferrule push 104 may have a receptacle. Alternatively, the polarity key 160 may be at a different location on the main body of the ferrule push, e.g., on any one of the sides.

The housing 106 is dimensioned to receive the miniature multi-fiber ferrule 108 with optical fibers 206 from a rear opening 164 in the housing 106. See, e.g., FIGS. 3 and 7. It should be noted that the housing 106 is shortened to fit inside an MMC adapter (about 4.8 mm in length). There is an opening 166 at a front end 168 of the housing 106 that may have a configuration that matches the configuration of the miniature multi-fiber ferrule 108. As noted above, a guide pin clamp or a spacer may be provided rearward of the miniature multi-fiber ferrule 108 (see FIGS. 6, 7, and 10). The ferrule push 104 is positioned rearward of the miniature multi-fiber ferrule 108, and is mostly inside the housing 106, but partially within the side latches 120 of the push-pull stick 102. The ferrule push 104 can optionally seat within a span or width of the push-pull stick 102, although typically it does not engage the push-pull stick 102.

The housing 106, as noted above, has a groove 130 on the top surface to receive the forward extension 108 of the push-pull stick 102. There are also openings 170 in the housing 106 to receive the pair of side latches 120 from the push-pull stick 102. Finally, there is preferably a wedge 172 along the bottom edges of the housing 106 to fit within a notch 174 on the dust cap 110.

The dust cap 110 covers the front end of the connector 100—where the miniature multi-fiber ferrule 108 extends beyond the housing 106. The fit between the dust cap 110 and the connector 100 is tight, as the main purpose of the dust cap 110 is to keep dust and debris from contaminating the miniature multi-fiber ferrule 108. While guide pins are not shown in the connector 100, they may be inserted and extend beyond the end face of the miniature multi-fiber ferrule 108. The dust cap 110 has sufficient space to accommodate the guide pins. There is also a slot 176 on the top of the dust cap 110 that receives a portion of the push-pull stick 102. See, e.g., FIG. 4. In particular, the projection 134 that rises through the opening 136 is received therein. The slot 176 of the dust cap 110 may also receive more or fewer components therein. The dust cap 110 is similar to those shown in Applicant's application Ser. No. 18/063,050, the contents of which are incorporated herein in their entirety.

The dust cap 110 also includes the notch 174 that receives the wedge 172 on the housing 106. The combination of the notch 174 and the wedge 172 also make for a more robust connection between the dust cap 110 and the housing 106 to prevent the dust caps 110 from being separated one another while in the pulling sock 208.

Figure 10:
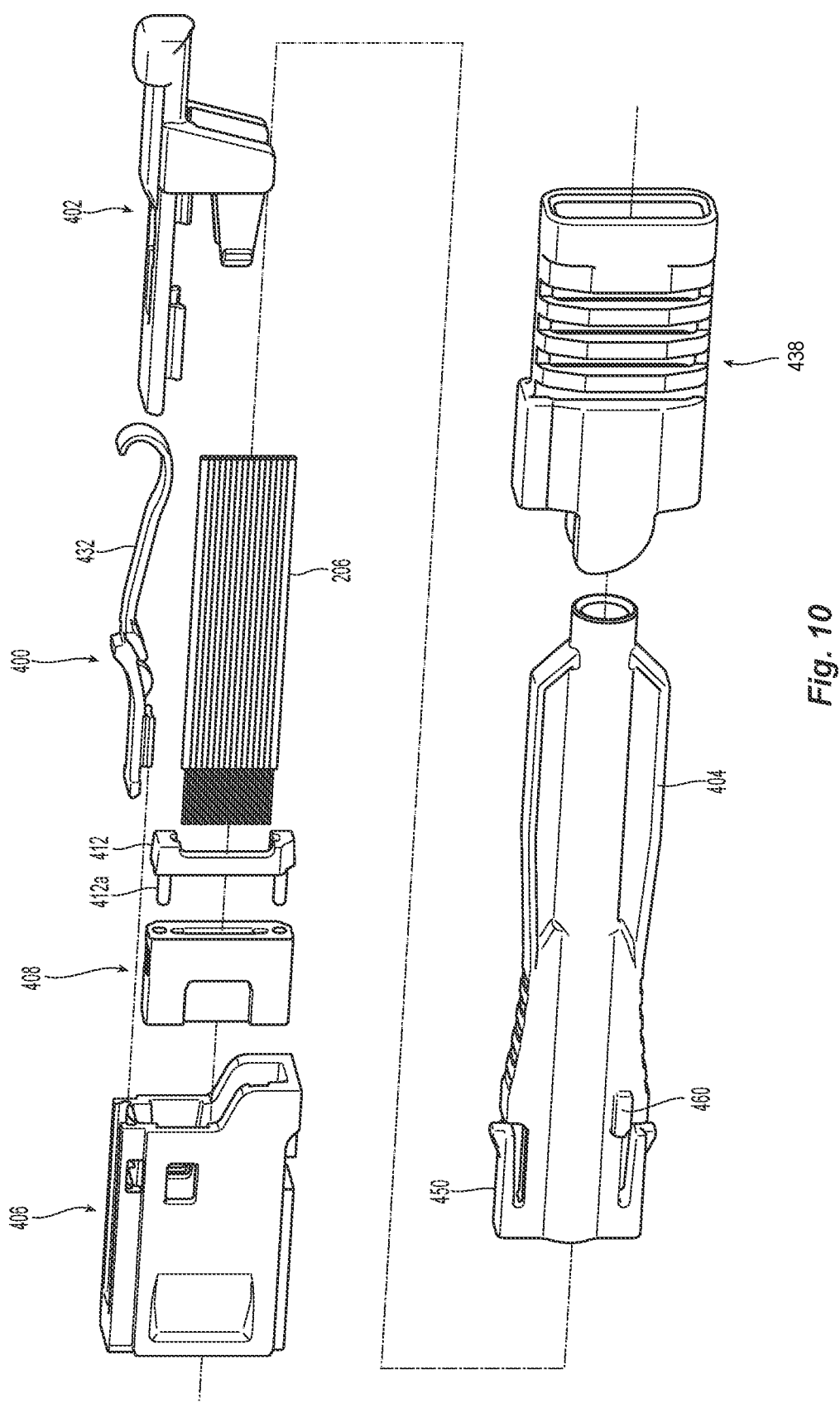
FIG. 10 is an exploded view of another embodiment of a small form factor fiber optic connector according to the present invention.

Another embodiment of a small form factor fiber optic connector 400 (connector 400) is illustrated in FIG. 10. The connector 400 is also used with the pulling sock (pulling plug) 208 to make the optical cable bundle. The connector 400 includes a shortened push-pull stick 402, a ferrule push 404, a housing 406, a miniature multi-fiber ferrule 408, and a dust cap 110. The dust cap 110 for this connector 400 would be the same as for connector 100. The housing 406, the miniature multi-fiber ferrule 408, and the latch mechanism 432 are preferably the same as in connector 100. Illustrated in FIG. 10 is a pin keeper 412 with guide pins 412a. The difference in connector 400 is the elongated ferrule push 404 that has a round rear end 146. The connector 400 also has a boot 438 that surrounds the elongated ferrule push 404 and cooperates with the push-pull stick 402 to install and remove the connector 400 from the adapter 300. It should be noted that the elongated ferrule push 404 extends rearwardly of all of the other components of the connector 400 (except the optical fibers). The elongated ferrule push 404 has similar projections 450 and a polarity key 460 as connector 100. The elongated rear portion of the ferrule push 404 extending rearwardly past the boot 438 also allows the user to push on the ferule push 404 to install the miniature multi-fiber ferrule 408 and the ferrule push 404 through the housing 106 and the boot 438. The housing 106 and the boot 438 are already pre-installed on the adapter 300.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A cable bundle attached to an optical fiber trunk cable having ribbonized optical fibers comprising:
 a plurality of terminated small form factor fiber optic connectors for inclusion in a pulling sock attached to the optical fiber trunk cable, each small form factor fiber optic connector including:
 a push-pull stick with a rear portion, a central portion and a forward extension extending away from the central portion and the rear portion, wherein the push-pull stick further includes a pair of side latches on opposing sides of the central portion, the pair of side latches also extending forward and away from the central portion and the rear portion;
 a ferrule push positioned underneath the forward extension of the push-pull stick and at least partially between the pair of side latches, there being a space to receive the ferrule push between the pair of side latches of the push-pull stick;
 a housing configured to engage the pair of latches of the push-pull stick and the at least one projection from the ferrule push;
 a miniature multi-fiber ferrule configured to support at least two optical fibers of the ribbonized optical fibers and engaged to a front portion of the housing, the miniature multi-fiber ferrule engageable directly or indirectly to a front surface of the ferrule push, wherein the miniature multi-fiber ferrule has an end face that is outside the housing when the miniature multi-fiber ferrule is seated inside the housing; and a dust cap engaged to the housing from a front end of the housing, the end face of the miniature multi-fiber ferrule being fully covered by the dust cap, wherein the dust cap, the housing, the miniature multi-fiber ferrule with the at least two optical fibers, the ferrule push, and the push-pull stick of a first of the plurality of terminated small form factor fiber optic connectors are provided inside the pulling sock with at least one additional one of the plurality of terminated small form factor fiber optic connector identical to the first small form factor fiber optic connector.

2. The cable bundle according to claim 1, further comprising an adapter panel having a plurality of adapters, the plurality of adapters are each shorter than 5 mm.

3. The cable bundle according to claim 1, wherein at least a portion of a rear end of the ferrule push extends underneath the rear end of the push-pull stick.

4. The cable bundle according to claim 1, the ferrule push having at least one projection with a latch at a front portion thereof.

5. The cable bundle according to claim 1, the dust cap has an opening for a polarity key on the push-pull stick.

6. The cable bundle according to claim 1, wherein the ferrule push has a non-circular opening to receive the at least two optical fibers therethrough.

7. The cable bundle according to claim 1, wherein the ferrule push has a circular opening to receive the at least two optical fibers therethrough.

8. The cable bundle according to claim 1, wherein the rear portion of the push-pull stick is an elongated projection parallel to and not engaging the at least two optical fibers.

9. The cable bundle according to claim 1, wherein the ferrule push extends rearwardly of all other components for each of the plurality of terminated small form factor fiber optic connectors to allow a user to push and pull on one or more of the plurality of terminated small form factor fiber optic connectors.

10. An optical cable bundle comprising:
a plurality of fiber optic connectors, each of the plurality of fiber optic connectors further comprising:
    a miniature multi-fiber ferrule having respective ribbonized optical fibers terminated therein, the miniature multi-fiber ferrule has dimensions smaller than a standard MT ferrule;
    a ferrule push associated with the miniature multi-fiber ferrule and having an opening for the respective ribbonized optical fibers, the ferrule push being loosely positioned rearward of miniature multi-fiber ferrule; and
    a ferrule dust cap engaged to the ferrule push and covering an end face of the miniature multi-fiber ferrule; and
a pulling sock for retaining the plurality of fiber optic connectors.

11. The optical cable bundle according to claim 10, wherein the miniature multi-fiber ferrule in each of the plurality of fiber optic connectors are TMT ferrules.

12. The optical cable bundle according to claim 10, further comprising a push-pull stick with a rear portion, a central portion and a forward extension extending away from the central portion and the rear portion, wherein the push-pull stick further includes a pair of side latches on opposing sides of the central portion, the side latches also extending forward and away from the central portion and the rear portion.

13. The optical cable bundle according to claim 12, wherein at least a portion of a rear end of the ferrule push extends underneath the rear end of the push-pull stick.

14. The optical cable bundle according to claim 10, the ferrule push having at least one projection with a latch at a front portion thereof.

15. The optical cable bundle according to claim 12, the ferrule dust cap has an opening for a polarity key on the push-pull stick.

16. The optical cable bundle according to claim 10, wherein the ferrule push has a non-circular opening to receive the optical fibers therethrough.

17. The optical cable bundle according to claim 10, wherein the ferrule push has a circular opening to receive the optical fibers therethrough.

18. The optical cable bundle according to claim 12, wherein the rear portion of the push-pull stick is an elongated projection parallel to and not engaging the optical fibers.

19. The optical cable bundle according to claim 10, further comprising an adapter panel having a plurality of adapters, the plurality of adapters are shorter than 5 mm.

20. An optical cable bundle comprising:
a plurality of fiber optic connectors, each of the plurality of fiber optic connectors further comprising:
    a miniature multi-fiber ferrule having respective ribbonized optical fibers terminated therein, the miniature multi-fiber ferrule has dimensions smaller than a standard MT ferrule;
    a ferrule push associated with the miniature multi-fiber ferrule and having an opening for the respective ribbonized optical fibers, the ferrule push being loosely positioned rearward of miniature multi-fiber ferrule; and
    a ferrule dust cap engaged to the ferrule push and covering an end face of the miniature multi-fiber ferrule; and
    a boot with a rear portion surrounding at least a portion of the ferrule push, a central portion and a forward extension extending away from the central portion and the rear portion, wherein the boot further includes a pair of side latches on opposing sides of the central portion, the pair of side latches also extending forward and away from the central portion and the rear portion; and
a pulling sock for retaining the miniature multi-fiber ferrule, the ferrule push and the ferrule dust cap.

* * * * *